United States Patent [19]

Verge

[11] Patent Number: 5,123,861

[45] Date of Patent: Jun. 23, 1992

[54] BATTERY BOOSTER INSULATING BOOT

[76] Inventor: Cyril A. Verge, 2 Hazel St., Lr. Sackville, Nova Scotia, Canada, B4E 1E4

[21] Appl. No.: 643,038

[22] Filed: Jan. 18, 1991

[30] Foreign Application Priority Data

Jul. 6, 1990 [CA] Canada ................................ 2020652

[51] Int. Cl.⁵ ............................................. H01R 13/52
[52] U.S. Cl. ................................... 439/522; 439/141; 439/822
[58] Field of Search ............... 439/141, 521, 522, 588, 439/592, 750, 822, 892, 636

[56] References Cited

U.S. PATENT DOCUMENTS

| 2,160,422 | 5/1939 | Shipman | 439/522 |
|---|---|---|---|
| 3,127,228 | 3/1964 | Greco et al. | 439/636 |
| 3,449,706 | 6/1969 | Carissimi | 439/141 |
| 3,544,952 | 12/1970 | Shannon | 439/522 |
| 4,810,199 | 3/1989 | Kar | 439/141 |
| 4,932,905 | 6/1990 | Richards | 439/822 |

*Primary Examiner*—Larry I. Schwartz
*Assistant Examiner*—Hien D. Vu
*Attorney, Agent, or Firm*—McFadden, Fincham, Marcus & Anissimoff

[57] ABSTRACT

A body of elastically deformable insulating material to encapsulate the handle assemblies of battery booster cables. The entire assembly is placed within the body of material therefore leaving no exposed metal surfaces and hence preventing the risk of electrical shock during the use of such cables.

16 Claims, 2 Drawing Sheets

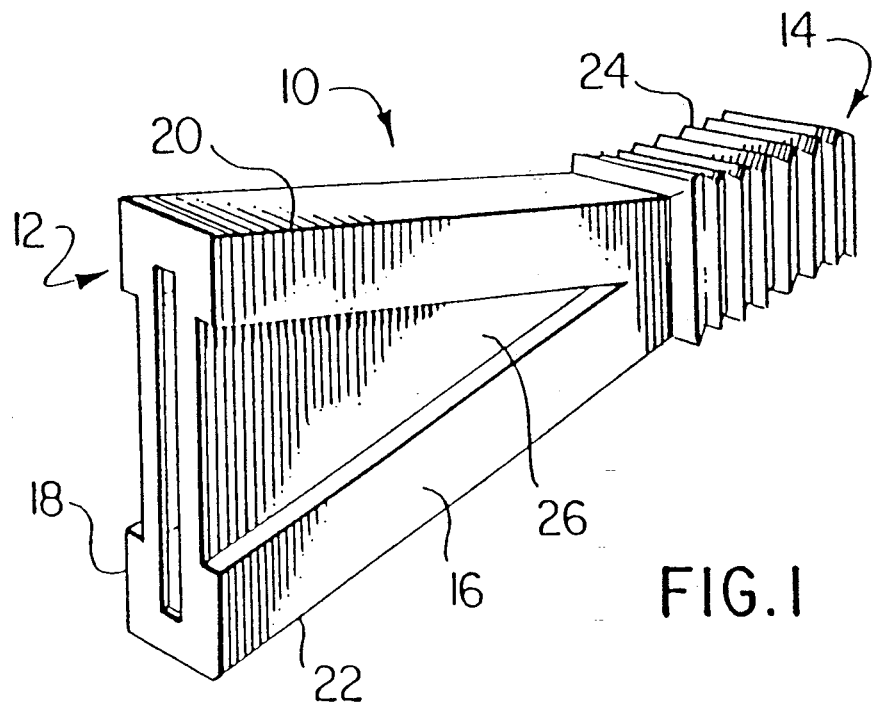
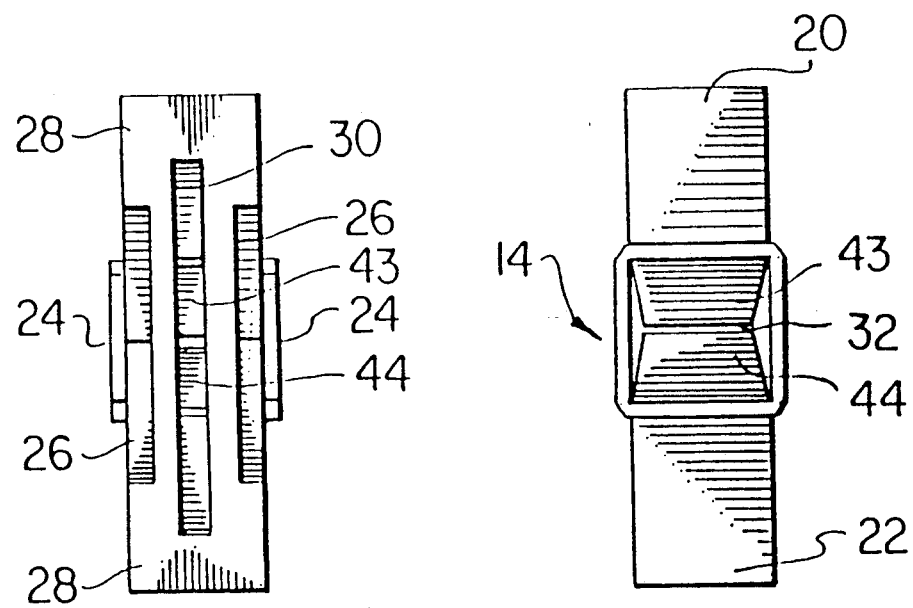
FIG. 1
FIG. 2
FIG. 3

BATTERY BOOSTER INSULATING BOOT

FIELD OF THE INVENTION

This invention relates to an insulating boot for encapsulating the handle assemblies of battery booster cables.

BACKGROUND OF THE INVENTION

In the known booster cable assemblies, the handles of the cables only include a small sleeve of plastic material around the conductive handles of the assemblies. This results in large conductive areas of the handles exposed. Recently, the handles have been manufactured to include a thermoplastic surrounding the majority of the handle, however, this arrangement still leaves the clamps or jaws of the handles exposed. In the case of inadvertent disconnection of a handle from a battery terminal during a boosting procedure, the remaining uninsulated area is likely to contact other metal surfaces. This disconnection results in sparking, potential battery heating, damage, or explosion. Additionally, late model automobiles having digital electronic instrumentation systems are particularly sensitive to such conditions.

Various insulated handle assemblies are known in the art, one of which is illustrated in U.S. Pat. No. 4,869,688. In this document, Merio discloses a handle assembly having a pair of half body portions of the handle which comprise an insulating material. Each body includes a metal jaw for contact with a body terminal. A similar arrangement is illustrated in U.S. Pat. No. 4,932,905. A primary limitation of this arrangement is that the conductive jaws are integral with the insulation and, in the event of breakage of the handles, the apparatus is no longer useful.

Further, in U.S. Pat. No. 4,929,199, there is disclosed a handle assembly in which the handles are coated with non-electroconductive material. The effectiveness of this application is inherently limited due to a susceptibility of the coating to flake, chip or become ineffective from oxidation etc.

The present invention eliminates these limitations and hazards of the known arrangement, by completely encapsulating the handles and clamps of battery booster cables within an elastic and electrically insulating body. In order to connect the cables to battery terminals, the handles of the cables are compressed which will only then expose the clamp for connection to a battery post. In this way, inadvertent disconnection will result in a completely encapsulated and therefore electrically neutral booster cable.

SUMMARY OF THE INVENTION

The present invention provides a battery booster boot adapted for encapsulating the handle assembly of a battery booster cable, the assembly having a pair of handles terminating in a clamping means adapted for placement about the terminal of a battery, the boot comprising a body of elastically deformable electrically insulating material, the body members having first and second opposed ends, sides, and faces, the first end having an aperture therein for insertion of the handle assembly within the body, the second end having an aperture therein whereby the clamping means of the handle assembly communicates with the battery terminal.

The boot member is preferably of a one piece construction, and as such, may be e.g. a molded member of suitable material. The material from which the boot member is made up will be nonconductive in nature and to this end, various types of plastics may be employed. Typically, thermoplastics such as polyolefin materials, e.g. polyethylene, polypropylene or copolymers thereof may be employed. Other polymeric compositions such as polyamines, PVC resins or the like may also be employed.

In place of utilizing a one-piece molded member, two or more sections may be joined together which have previously been molded as separate halves. The preferred technique of forming the boot can thus vary depending on the type of construction of the battery booster itself.

Still further, the dimensions of the boot will vary but will be of a size sufficient to envelope or encapsulate the various components of the battery booster. In general, it is preferred that the boot will conform in shape and size to the battery booster. In this respect, the thickness of the boot of the present invention will vary but will range from, e.g. 1/16" to ¼" or more depending on the type of material being employed for this purpose.

In the boot of the present invention, the end of the boot or nozzle is preferably constructed so as to be provided with a plurality of accordion type folds to permit the same to retract or extend. Preferably, the accordion pleats of the boot will extend inwardly of the end of the boot having the access opening to permit a user to gain access to the jaws of the booster and typically, the accordion pleats desirably extend inwardly from ¼" to 1" or more. In place of accordion pleats, the end of the boot may be provided with separate means for permitting retraction and expansion for this purpose. Thus, the boot of the present invention can be molded as a separate component and a further component attached by suitable means, e.g. adhesive or the like.

Thus, it an object of the present invention to provide an encapsulating body which prolongs the usefulness of battery booster handle assemblies.

A further object of the present invention is to provide a boot for a booster handle assembly which completely encapsulates the handles in the event of inadvertent disconnection from a battery terminal.

Another object of the present invention is to provide a battery booster handle assembly having a pair of handles terminating in a clamping means adapted for placement about the terminal of a battery, in combination with a battery booster boot comprising a body of elastically deformable electrically insulating material, the body having first and second opposed ends, side and faces, the first end having an aperture therein for insertion of the handle assembly within the body, the second end having an aperture therein whereby the clamping means of the handle assembly communicates with the battery terminal.

In yet another object of the present invention there is provided an encapsulating body for a battery booster handle assembly adapted to receive differently sized or shaped handle assemblies.

A still further object of the present invention is to provide an encapsulating body for a battery booster handle assembly having a retractable and self-closing nozzle segment.

Having thus generally described the invention, reference will now be made to the accompanying drawings illustrating preferred embodiments.

BRIEF DESCRIPTION OF THE DRAWINGS

FIG. 1 is a perspective view of the insulating boot of the present invention;

FIG. 2 is an end elevational view of the first end of the battery booster boot;

FIG. 3 is an end elevational view of the battery booster of the second end;

DETAILED DESCRIPTION OF THE PREFERRED EMBODIMENTS

Figure 4:
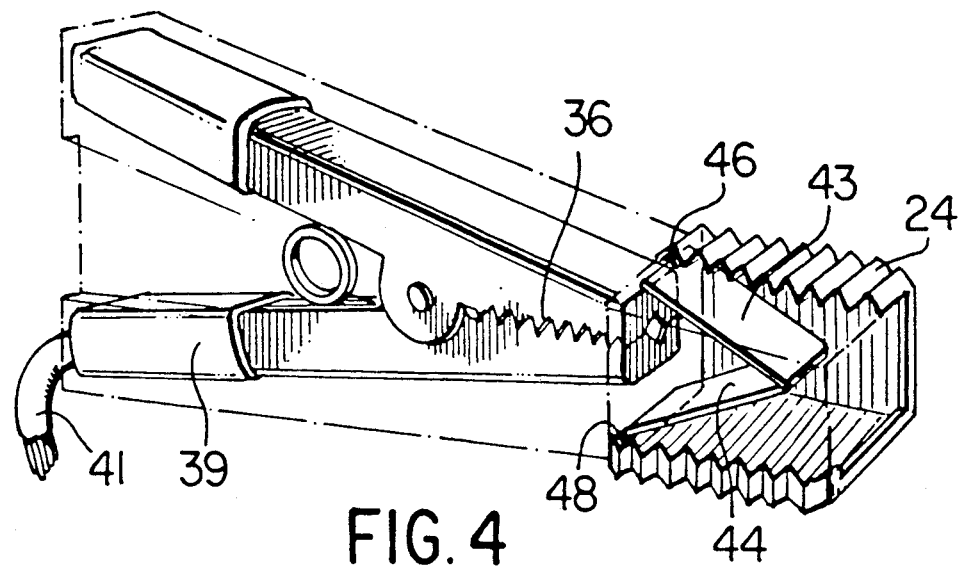
FIG. 4 is a view of the battery booster boot with the clamping means positioned therein.

Referring to FIG. 1, shown is a perspective view of the present invention. The encapsulating body of the boot is generally indicated by numeral 10. The body 10 is preferably fabricated from an elastically deformable and electrically insulating material, e.g. PVC. The body 10 includes opposed ends 12 and 14, opposed faces 16 and 18 and opposed sides 20, 22. The boot body 10 generally describes the triangular shape of conventional handle assemblies, e.g. two handles converging to clamping means, and preferably includes a retractable and self-protracting segment 24 integral with the body 10. It is further preferred that the body 10 have, spaced inwardly from the sides 20 and 22, a recessed area 26 on each face 16 and 18.

Referring to FIG. 2, the recessed areas 26 relative to the body 10, define compartments 28 adapted for placement of the handles of the handle assemblies therein. The compartments 28 maintain the proper orientation of the handles of a handle assembly when in use. The handle assembly of a battery booster cable is placed within the body 10 through an aperture 30 located at end 12. A preferred location of the aperture 30 is spaced inwardly from the faces 16 and 18 and the ends of end 12. The aperture 30, which preferably is just sufficient in size to permit insertion of a handle assembly within the body 10, is a narrow slot. The slot 30 is preferably narrow to prevent contaminants e.g. salt, etc. from coming in contact with the wire 41 which is joined to handle 39 of the clamping means. The positioning of the slot 30 on end 12 of the body 10 alleviates bending stress at the site of connection of the cable 41 and handle 39. These preferred features contribute in extending the useful life of the cables.

Referring to FIGS. 3 and 4, shown are front and cut-away views of end 14 and a cut away view of the body illustrating the handle assembly thereof. FIG. 3 shows the open end 14 of the body 10 illustrating the slats 43 and 44. It is particularly preferred that the slats 43 and 44 comprise stiff and resiliently deflectable material, preferably which is integrally molded with the body 10. It is further preferred that the slats 43 and 44 are fixedly secured at an upper surface 46 and lower surface 48 interiorly and rearwardly of the nozzle segment 24. In this way, slat 43 tapers from the point 46 downwardly and slat 44 tapers upwardly from point 48 to converge and define slit 32. This arrangement maintains the clamping means 36 in a spaced apart relationship from end 14.

Figure 5:
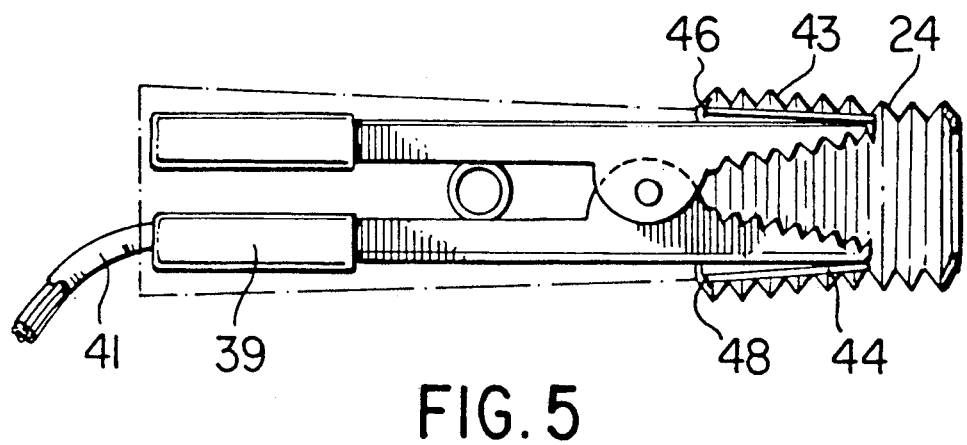
FIG. 5 is a view of the battery booster boot illustrating the positioning of the handle assembly within the boot prior to retraction of the nozzle.
Figure 6:
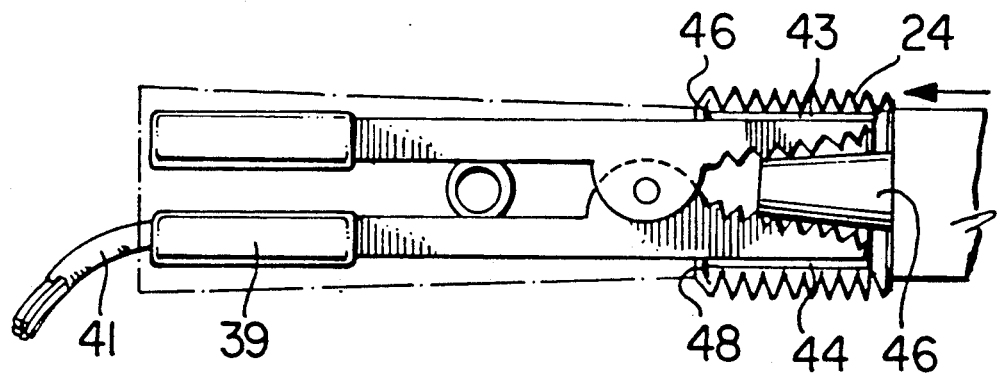
FIG. 6 is a view of the battery booster boot with the clamping means therein as positioned on a post.

Referring to FIGS. 5 and 6, shown are cut away views illustrating the battery booster boot in use. The nozzle segment 24 in a normal or unretracted state is shown in FIG. 5. The handle assembly is compressed with the clamping means 36, which are guided by contracting and deflecting each of slats 43 and 44. Upon contact of the clamping means 36 to a battery post 46, the nozzle segment 24 is retracted to provide unimpeded contact of the clamping means 36 with post 46. In the event of inadvertent disconnection of clamping means 36 from post 46, the slats 43 and 44, being in an unnatural state i.e. deflected, will converge and self-close thus forming the clamping means 36 to be rearwardly positioned and hence spaced from end 14. Additionally, nozzle segment 24 will return to a natural state i.e. self-protract. These preferred features prevent the exposure of the clamping means 36 to a battery or other conductive surface, which could result in a hazardous situation.

The encapsulating body 10 will also preferably include polarity indication in the form of red or black color associated with a respective handle assembly.

As those skilled in the art would realize these preferred illustrated details can be subjected to substantial variation without affecting the function of the illustrated embodiments.

Although embodiments of the invention have been described above, it is not limited thereto and it will be apparent to those skilled in the art that numerous modifications form part of the present invention insofar as they do not depart from the spirit, nature and scope of claimed and described invention.

I claim:

1. A battery booster boot adapted for encapsulating the handle assembly of a battery booster cable, said assembly having a pair of handles terminating in a clamping means adapted for placement about the terminal of a battery, said boot comprising a body of elastically deformable electrically insulating material, said body having first and second opposed ends, sides, and faces, said first end having an aperture therein for insertion of said handle assembly within said body, said second end including a retractable segment having a plurality of pleats and an aperture extending therethrough.

2. The battery booster boot as defined in claim 1, wherein said aperture of said first end is a slot.

3. The battery booster boot as defined in claim 1, wherein said slot is spaced inwardly from said opposed sides and faces.

4. The battery booster boot as defined in claim 1, wherein said body includes a pair of compartments adapted for placement in said handles of said handle assembly therein.

5. The battery booster boot as defined in claim 1, wherein said retractable segment is self-protracting.

6. The battery booster boot as defined in claim 1, wherein said upper and lower interior surfaces of said retractable segments includes one of said guide members affixed thereto.

7. The battery booster boot as defined in claim 1, wherein said body comprises a polymeric material.

8. The battery booster boot as defined in claim 1, wherein said body includes a retractable segment at said first end.

9. The battery booster boot as defined in claim 8, wherein said retractable segment includes upper and lower interior surfaces.

10. The battery booster boot as defined in claim 1, wherein said segment includes guide means therein.

11. The battery booster boot as defined in claim 10, wherein said guide means comprises a pair of spaced apart guide members.

12. The battery booster boot as defined in claim 1, wherein said body includes polarity indicating means thereon.

13. The battery booster boot as defined in claim 12, wherein said polarity indicating means comprises a coloured body member.

14. The battery booster boot as defined in claim 11, wherein said guide means comprise resiliently deflectable slats.

15. The battery booster boot as defined in claim 14, wherein said guide members are self-closing.

16. A battery booster handle assembly having a pair of handles terminating in a clamping means adapted for placement about the terminal of a battery, in combination with a battery booster boot comprising a body of elastically deformable electrically insulating material, said body having first and second opposed ends, sides and faces, said first end having an aperture therein for insertion of said handle assembly within said body, said second end having a retractable segment including a plurality of pleats and having an opening therein extending between said opposed sides and faces whereby said clamping means of said handle assembly communicates with said battery terminal.

* * * * *